United States Patent
Carmeli et al.

(10) Patent No.: US 9,459,886 B2
(45) Date of Patent: Oct. 4, 2016

(54) AUTONOMOUS SLEEP MODE

(71) Applicant: Texas Instruments Incorporated, Dallas, TX (US)

(72) Inventors: Asaf Carmeli, Kfar Saba (IL); Ben Gilboa, Tel-Aviv (IL); Avi Baum, Giva't Shmuel (IL); Barak Cherches, Ramat Hakovesh (IL); Mukesh Kumar, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 171 days.

(21) Appl. No.: 14/452,700

(22) Filed: Aug. 6, 2014

(65) Prior Publication Data

US 2016/0041831 A1    Feb. 11, 2016

(51) Int. Cl.
| | |
|---|---|
| G06F 1/32 | (2006.01) |
| G06F 9/44 | (2006.01) |
| G06F 13/28 | (2006.01) |
| G06F 13/42 | (2006.01) |
| G06F 13/16 | (2006.01) |

(52) U.S. Cl.
CPC .......... *G06F 9/4418* (2013.01); *G06F 1/3287* (2013.01); *G06F 13/1673* (2013.01); *G06F 13/28* (2013.01); *G06F 13/4291* (2013.01); *Y02B 60/1228* (2013.01); *Y02B 60/1235* (2013.01)

(58) Field of Classification Search
None
See application file for complete search history.

(56) References Cited

U.S. PATENT DOCUMENTS

| | | | |
|---|---|---|---|
| 7,386,661 B2 | 6/2008 | Perozo et al. | |
| 7,603,574 B1 * | 10/2009 | Gyugyi | H04L 12/12 370/232 |
| 2002/0031226 A1 * | 3/2002 | Simonsen | H04B 3/54 380/255 |
| 2007/0230484 A1 * | 10/2007 | Hu | H04L 12/40039 370/401 |
| 2009/0319817 A1 * | 12/2009 | Kallam | G06F 1/3203 713/500 |
| 2010/0087147 A1 | 4/2010 | Ramsdale | |
| 2013/0013825 A1 | 1/2013 | Muto | |
| 2014/0240328 A1 * | 8/2014 | Surti | G06F 1/3206 345/506 |

FOREIGN PATENT DOCUMENTS

WO    2010003622 A1    1/2010

* cited by examiner

*Primary Examiner* — Paul Yanchus, III
(74) *Attorney, Agent, or Firm* — John R. Pessetto; Frank D. Cimino

(57) ABSTRACT

A system and method is disclosed that enables a peripheral or slave device to seamlessly transition in and out of sleep state while remaining completely transparent to host software. When the device is in a sleep mode and incoming data is detected, the device begins a wake-up procedure and data is routed to a first, transitional memory. The size of the transitional memory is selected such that it is capable of buffering data received during time required for the system memory to stabilize from wake-up. Once a second, extended memory is stabilized, the data is buffered from the transitional memory to the extended memory. The device resumes normal operation when its processor has initialized and can read data from the extended memory.

17 Claims, 3 Drawing Sheets

AUTONOMOUS SLEEP MODE

BACKGROUND

Sleep mode and other low power states are important operations for active peripherals that are used in battery-powered devices due to the strict battery-life demand. When the battery-powered peripheral device is in a sleep mode and a host device needs to communicate, the peripheral must first wake-up. Then the host must wait for an acknowledgement that it is awake before sending data to the peripheral device. Once the data has been received and the communication completed, the peripheral device can reenter a sleep mode or low-power state. For example, Serial Peripheral Interface (SPI) is a transport layer commonly used between microcontrollers and their peripherals. SPI is a de-facto standard with no payload or flow control definitions. As a result, proprietary out-of-band behavior needs to be executed between the host and peripheral device to enable power-saving handshaking, which entails additional hardware and software complexity as well as transaction overhead, which translates into excessive host load.

The host device may not know when the peripheral device is in a sleep mode. As a result, the host must send a wake-up signal and wait for an acknowledgement that indicates the peripheral is awake before sending data. This delay has an impact on system throughput.

SUMMARY

Embodiments of the invention provide a hardware mechanism that eliminates the need for host software involvement. The hardware mechanism buffers incoming data while the peripheral device is in a low power state. The buffering operations during the low power state are performed using the incoming clock from the host. When the hardware mechanism detects incoming traffic while in a low-power mode, it will trigger the peripheral device's wake-up. This solution can be applied any inter-chip protocol that does not have built-in flow control, such as SPI, 2-wire serial interface, universal asynchronous receiver/transmitter (UART), Inter-Integrated Circuit (I²C), etc. While using a standard transport layer that only has its physical layer defined, the invention allows the host to be completely agnostic to the power state of the peripheral device.

The autonomous device wake-up process described herein enables dynamic power saving without harming integration efforts and performance. The power saving scheme may be asynchronous to the user application. The host device may be completely agnostic to the power state of the peripheral device.

Since the host is agnostic to the power state of the device, it is assumed that the host can start sending a burst of data at the maximum rate at any time, including at such a time when the device is in a low power state, or in the process of entering or exiting one. In turn, the device has to be able to absorb all the data while waking up and then seamlessly hand off the data to the slave device's processor for further processing, while continuing to receive data.

The autonomous sleep mode described herein allows the device to lower power consumption as a result of increased sleep-mode duration, which is not interrupted until data is actually started to be received from a host. Additionally, processor load may be reduced because sleep transition logic may be removed. Additionally, data bus overhead is reduced.

BRIEF DESCRIPTION OF THE DRAWINGS

Figure 1:
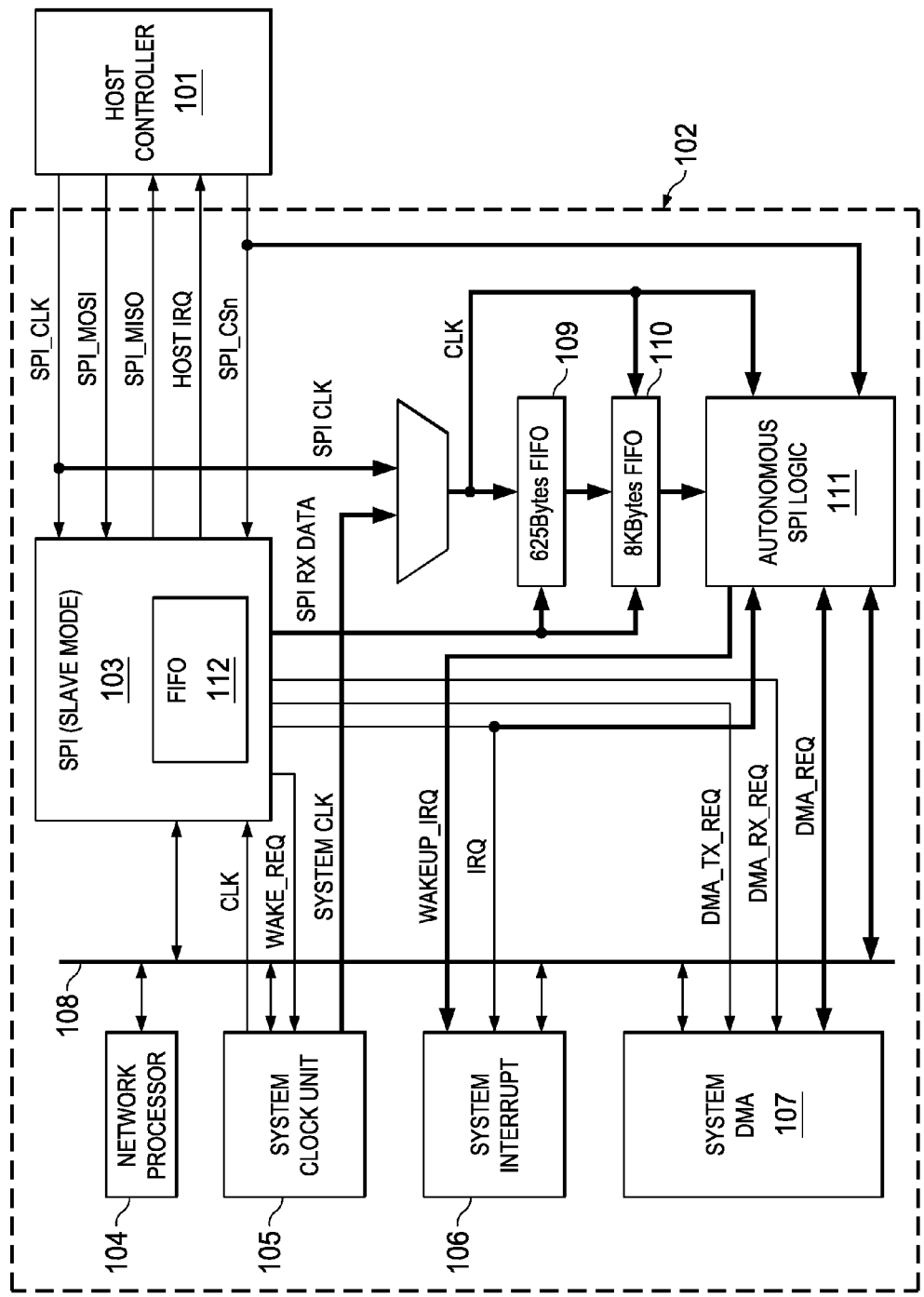

Having thus described the invention in general terms, reference will now be made to the accompanying drawings, wherein:

FIG. 1 is a block diagram of a system employing an autonomous mode according one embodiment.

Figure 2:
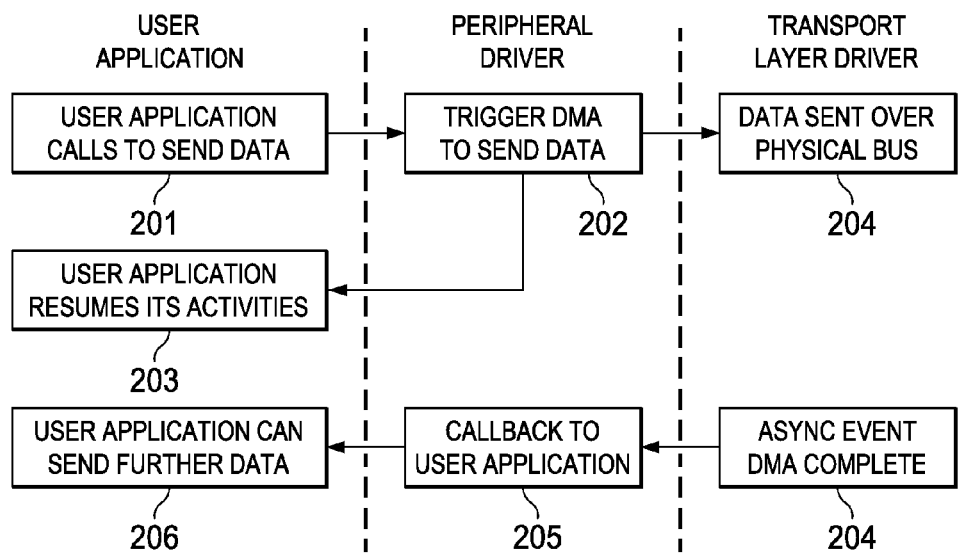

FIG. 2 illustrates the flow of operation for a host application according to one embodiment.

Figure 3:
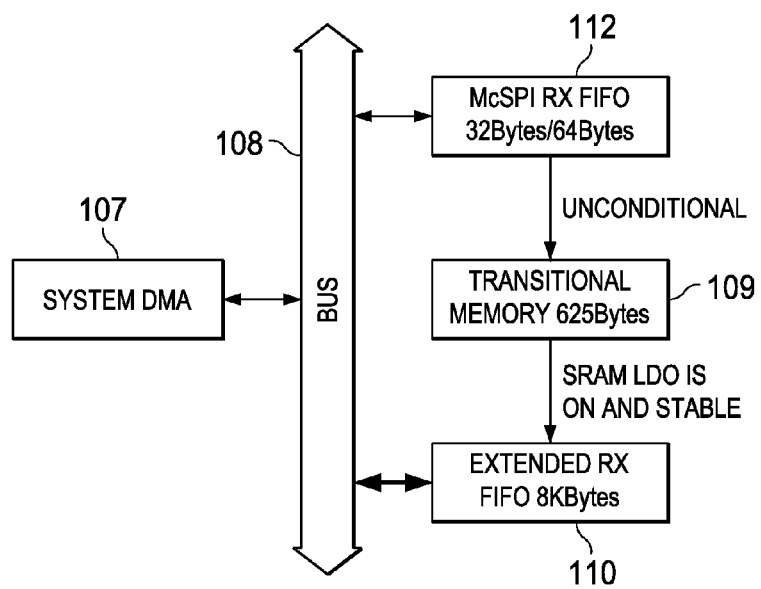

FIG. 3 illustrates data flow in a device using autonomous sleep mode. The goal of the autonomous module is to pass all incoming data to the extended memory.

Figure 4:
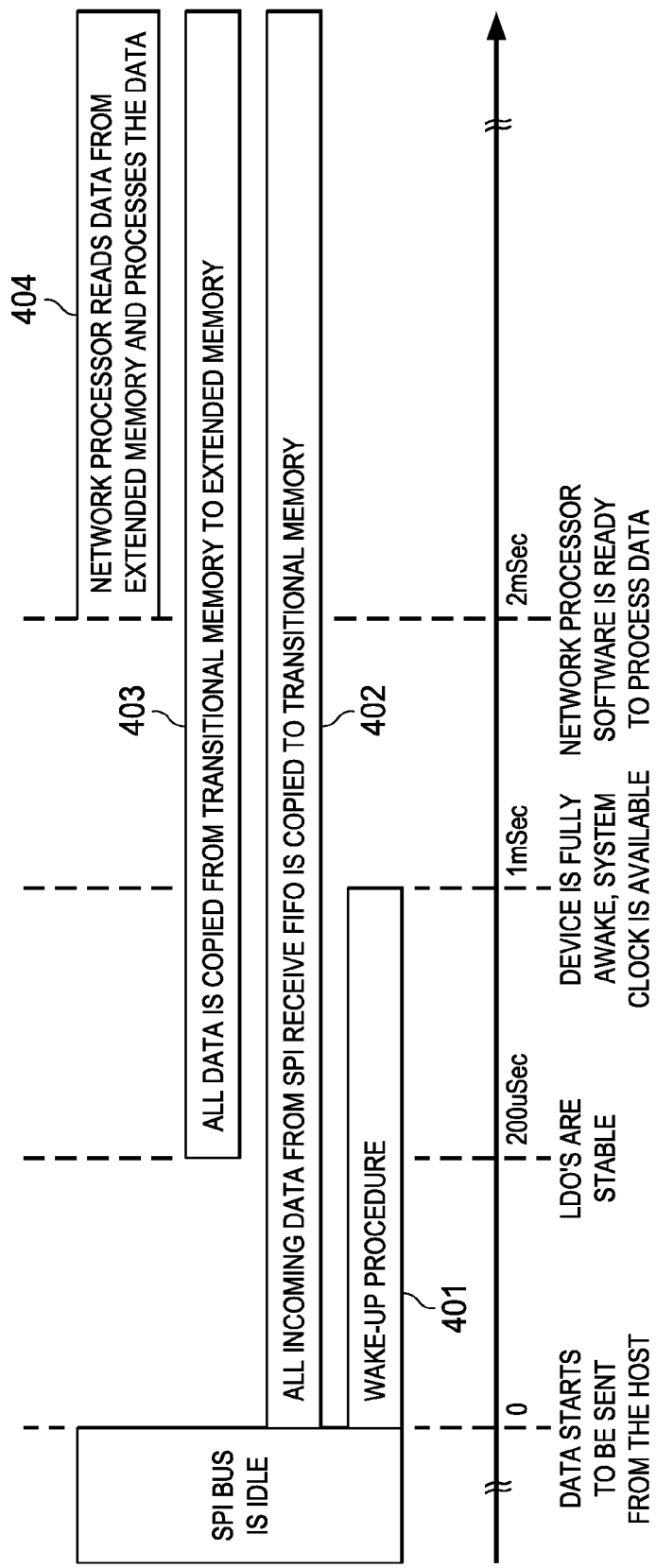

FIG. 4 is a high-level timing diagram for the autonomous sleep mode according to one embodiment.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

In one embodiment, an apparatus enables a peripheral or slave device to seamlessly transition in and out of sleep mode or a low-power state in a manner that is completely transparent to host software. In an example embodiment, such an apparatus may use SPI as its transport layer.

FIG. 1 is a block diagram of a system employing an autonomous mode according one embodiment. A host controller 101 is in communication with a peripheral or slave device 102. Peripheral device 102 includes a Serial Peripheral Interface (SPI) module 103 operating in slave mode. Peripheral device 102 includes network processor 104, system clock unit 105, system interrupt module 106, and system direct memory access (DMA) controller 107. The components of peripheral 102 communicate via system bus 108.

Peripheral device 102 further includes a transitional memory 109 and an extended memory 110, which may be, for example, first-in first-out (FIFO) memory or data buffer. Transitional memory 109 is configured to operate when peripheral 102 is in a sleep-mode operating at low power. When operating at normal power, data from transitional memory 109 is passed to extended memory 110 and then to autonomous SPI module 111, which provides the logic required to support the autonomous transition between a sleep state and an awake state.

Host controller 101 communicates directly with SPI module 103 in peripheral 102 using the following signals:

| | |
|---|---|
| SPI_CLK | SPI module serial clock input |
| SPI_MOSI | SPI module serial data master output (slave input) |
| SPI_MISO | SPI module serial data master input (slave output) |
| SPI_CSn | SPI module chip select input |
| Host IRQ | SPI interrupt request output |

Transitional memory 109, extended memory 110, and autonomous SPI module 111 use the clock signal from system clock unit 105 (System CLK) when peripheral 102 is in an awake state or may use the clock signal from host controller 101 (SPI_CLK) when peripheral 102 is in a sleep state or transitioning to an awake state.

Host controller 101 may initiate data transfer to peripheral 102 at any time. The autonomous mode supports the worst case, which occurs, for example, when host 101 begins sending a continuous stream of data while peripheral device 102 is in a low-power state. Peripheral 102 illustrates one embodiment of a device that supports an autonomous mode for a host transport layer that does not support any kind of flow control, such as SPI, while keeping the hardware requirements and software constraints to a bare minimum.

For purposes of illustration only and without limiting the scope of the invention described herein, the example embodiment in FIG. 1 assumes the following:

Host device 101 sends data at a maximum speed, such as 25 Mbps.

The time required for low dropout (LDO) regulators to stabilize from a wake-up event until memory is working at 1.2V is, for example, less than 200 uSec.

The time required for peripheral device 102 to fully wake up is, for example, less than 1 mSec.

Network processor 104 requires additional time, such as another 1 mSec, to re-initialize and resume normal operation after waking up.

Since host 101 can start transmitting data at any given time at the maximum rate, device 102 should be able to buffer the maximum amount of data that can be received during the wake-up interval. This will allow the network processor 104 to begin processing data received during the wake-up period once it is fully awake.

The wake-up process is divided into three stages. First, from low power state to LDOs ready (i.e., SRAM LDO is up and stable)—less than 200 uSec. Second, from LDOs ready to hardware fully awake—less than 800 uSec. Third, from hardware fully awake to network processor 104 ready—less than 1 mSec. Accordingly, the total time to buffer data during wake up is up to 2 mSec.

During the first wake-up stage (i.e. from low power state to LDOs ready), all incoming traffic is buffered in transitional memory 109 which can function at the lower OPP of the keep-alive voltage. For the next two wake-up stages, incoming traffic is buffered in extended memory 110. Once the network processor 104 is up and running (i.e., post-initialization, once the third wake-up stage is complete), network processor 104 will parse all buffered data from extended memory 110 in the same manner as if the data was being read directly from FIFO 112 in SPI 103. Since this method can be used even when device 102 is awake, network processor 104 may interface with extended memory 110 instead of the SPI FIFO 112 at any time.

To implement this autonomous mode scheme, transitional and extended memories 109, 110 and autonomous SPI module 111 are added to peripheral device 102. The size of transitional memory 109 is calculated based upon the amount of data that can be received from host 101 during the first wake-up stage. In the example illustrated herein, the first wake-up stage takes 200 uSec for the LDOs to stabilize. At a 25 Mbps data rate, 5000 bits or 625 Bytes are transferred during this stage. Accordingly, transitional memory 109 should be capable of operating at sleep OPP and have a size of at least 625 Bytes to meet the requirements of the first wake-up stage Data received during the remaining wake-up stages while device 102 fully wakes up, including the time required for network processor 104 to initialize after waking up and to resume normal operations, is buffered to extended memory 110. Assuming 200 uSec+800 uSec for full wake-up (i.e., first and second wake-up stages) and 1 mSec for network processor 104 initialization (i.e., third wake-up stage), the amount of data to be buffered by the extended memory 110 is approximately 50,000 bits or 6250 Bytes. To ease software constraints during wake-up initialization and to make memory 110 easier to instantiate, a memory size of 8 Kbytes is used in the example described herein.

When system clock 105 is unavailable during wake-up, transitional and extended memories 109, 110 and autonomous SPI module 111 operate on the incoming SPI clock (SPI_CLK). If the clock signal is interrupted, further processing of the data will be completed once the system clock 105 signal (System CLK) becomes available.

The incoming transmission from host 101 must trigger device 102 to wake up. When autonomous SPI module 111 has been set for operation, it is responsible to trigger a wake-up interrupt request (IRQ) back to the power, reset, and clock management (PRCM) function upon detecting an edge on the SPI_CLK pin. This request takes into account the following points. Since the SPI clock may "park" at any logical level when idle (depending on the clock's polarity or the SPI mode), the clock edge detection for waking up device 102 may be configurable (i.e. triggered by a rising and/or falling edge). This avoids the situation in which a transition from a last transaction into parking mode triggers the device 102 wake-up process while device 102 is going to sleep (e.g., in case there is a long delay between the last bit and the parking position).

In the case where the SPI communicates are on a shared bus, the device 102 hardware should verify that SPI_CSn is asserted when the clock edge is detected. If SPI_CSn is not asserted, then toggling of the clock signal should not wake up device 102. In the case of a three-wire mode, this condition may be configurable by a register, so that the triggering occurs only by the clock's edge.

In addition to waking up device 102 when data is received from the host 101, other devices may also need to be woken up. For example, in the case of a wireless transmitter, when data is received from the host it is understood that a WLAN processor will eventually have to transmit the data. Accordingly, upon detection of incoming data, autonomous SPI module 111 may also be configurable to trigger a wake-up for the WLAN processor as well.

FIG. 2 illustrates the flow of operation for a host application according to one embodiment. Using autonomous sleep mode, the host application and peripheral driver may be agnostic of the peripheral device's power state (i.e., sleep or awake) and may send data at any time. The application flow follows these general steps. In step 201, a user application sends data to a peripheral driver. In step 202, the peripheral driver triggers DMA and, in step 203, returns control to the user application. In step 204, a transport layer driver sends data over a physical bus.

In step 204, the transport layer driver indicates that data sending is complete. In step 205, after the DMA finishes sending data, the peripheral driver calls back to the user application to signal data was sent. In step 206, the user application sends additional data as needed.

Using the autonomous sleep mode disclosed herein, if the peripheral device was in sleep mode and the host will be delayed, then the user application will not be affected. Incorporating the autonomous sleep mode into the peripheral device requires sufficient hardware to buffer enough information to allow seamless writing from the host (based upon the maximum supported clock rate) and to handle the data upon exiting sleep mode.

FIG. 3 illustrates data flow in a device using autonomous sleep mode. The goal of the autonomous module is to pass all incoming data to the extended memory 110. The receive FIFO 112 in the SPI module passes incoming data to transitional memory 109, which in turn will pass the data onto the extended memory 110 when able. Software may interface to the extended memory as a large FIFO that will be managed by the hardware. Extended memory 110 is addressable by system DMA 107 over bus 108.

FIG. 4 is a high-level timing diagram for the autonomous sleep mode according to one embodiment. At time 0, data starts to be sent from the host device. The receipt of this data begins the wake-up procedure 401. During the wake-up procedure, the device goes from a low-power state to LDOs ready (SRAM LDO up and stable by 200 uSec) and then to hardware fully awake (within 800 uSec after LDOs ready).

Starting at time 0, all incoming data from the host goes to the SPI receive FIFO and is then copied to a transitional memory (402). Once the LDOs are stable at 200 uSec, data is copied from the transitional memory to an extended memory (403). The SPI receive FIFO, transitional memory, and extended memory use the host clock until the system clock is available, which occurs by 1 mSec.

It will take approximately 1 uSec from hardware fully awake at 1 uSec to network processor ready. By 2 uSec after data is started to be received, the network processor is fully awake. The network processor then reads data from the extended memory and begins processing the data (404).

In one embodiment, to prevent changes in the SPI module, an interrupt indication can be used to trigger the autonomous mode logic. For example, the "FIFO not empty" signal may be used as this interrupt. Using this signal, when there is any data in the FIFO, the data will be passed on to the transitional memory and then to the extended memory.

Although the example embodiment described herein uses SPI, it will be understood that this invention may be applied to any other inter-chip protocol that does not have built in flow control, such as 2-wire UART and I²C.

Many of the functions described herein may be implemented in hardware, software, and/or firmware, and/or any combination thereof. When implemented in software, code segments perform the necessary tasks or steps. The program or code segments may be stored in a processor-readable, computer-readable, or machine-readable medium. The processor-readable, computer-readable, or machine-readable medium may include any device or medium that can store or transfer information. Examples of such a processor-readable medium include an electronic circuit, a semiconductor memory device, a flash memory, a ROM, an erasable ROM (EROM), a floppy diskette, a compact disk, an optical disk, a hard disk, a fiber optic medium, etc.

The software code segments may be stored in any volatile or non-volatile storage device, such as a hard drive, flash memory, solid state memory, optical disk, CD, DVD, computer program product, or other memory device, that provides computer-readable or machine-readable storage for a processor or a middleware container service. In other embodiments, the memory may be a virtualization of several physical storage devices, wherein the physical storage devices are of the same or different kinds. The code segments may be downloaded or transferred from storage to a processor or container via an internal bus, another computer network, such as the Internet or an intranet, or via other wired or wireless networks.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:

1. A device, comprising:
   an input buffer coupled to an input from a host device;
   a transitional memory coupled to the input buffer, the transitional memory configured to operate while the device is in a sleep-mode power state; and
   an extended memory coupled to the transitional memory, the extended memory configured to receive data from the transitional memory after waking up from a sleep-mode, wherein an extended memory size is selected based upon a maximum amount of data that can be received from the transitional memory while a device processor is waking up from the sleep mode.

2. The device of claim 1, wherein a transitional memory size is selected based upon a maximum amount of data that can be received from the host while the extended memory is waking up from the sleep mode.

3. The device of claim 1, wherein the extended memory begins receiving data from the transitional memory when a low dropout (LDO) regulator stabilizes during a wake-up process.

4. The device of claim 1, further comprising:
   a system clock coupled to the input buffer, the transitional memory, and the extended memory; and
   a host clock signal interface coupled to the input buffer, the transitional memory, and the extended memory.

5. The device of claim 4, wherein the input buffer, the transitional memory, and the extended memory operate on a host clock signal when a system clock signal is not available.

6. The device of claim 5, wherein the system clock signal is not available during a wake-up process.

7. The device of claim 1, further comprising:
   an interface module coupled to the host device, and wherein the input buffer is a component of the interface module.

8. The device of claim 7, wherein the interface module is a Serial Peripheral Interface (SPI) module.

9. A method, comprising:
   receiving data at a device that has entered a power saving mode;
   buffering the data in a transitional memory in the device, the transitional memory configured to operate while the device is in the power saving mode;
   initiating a wake-up process in the device; and
   buffering data from the transitional memory to an extended memory when the extended memory has returned to an operating mode from the power saving mode, wherein an extended memory size is selected based upon a maximum amount of data that can be received from the transitional memory while a device processor is waking up from the power saving mode.

10. The method of claim 9, wherein a transitional memory size is selected based upon a maximum amount of data that can be received from the host while the extended memory is waking up from the power saving mode.

11. The method of claim 9, wherein the extended memory begins receiving data from the transitional memory when a low dropout (LDO) regulator stabilizes during the wake-up process.

12. The method of claim 9, further comprising:
   clocking data into the transitional memory and the extended memory using an external host clock signal when a device clock signal is not available.

13. The method of claim 12, wherein the device clock signal is not available during the wake-up process.

14. The method of claim 9, wherein the data is received at an interface module in the device.

15. The method of claim 14, wherein the interface module is a Serial Peripheral Interface (SPI) module.

16. The method of claim 14, wherein the interface module is a serial interface.

17. The method of claim 16, wherein the interface module is selected from a Universal Asynchronous Receiver/Transmitter (UART) device, an Inter-Integrated Circuit (I$^2$C) device, and a 2-wire serial interface.

\* \* \* \* \*